UNITED STATES PATENT OFFICE.

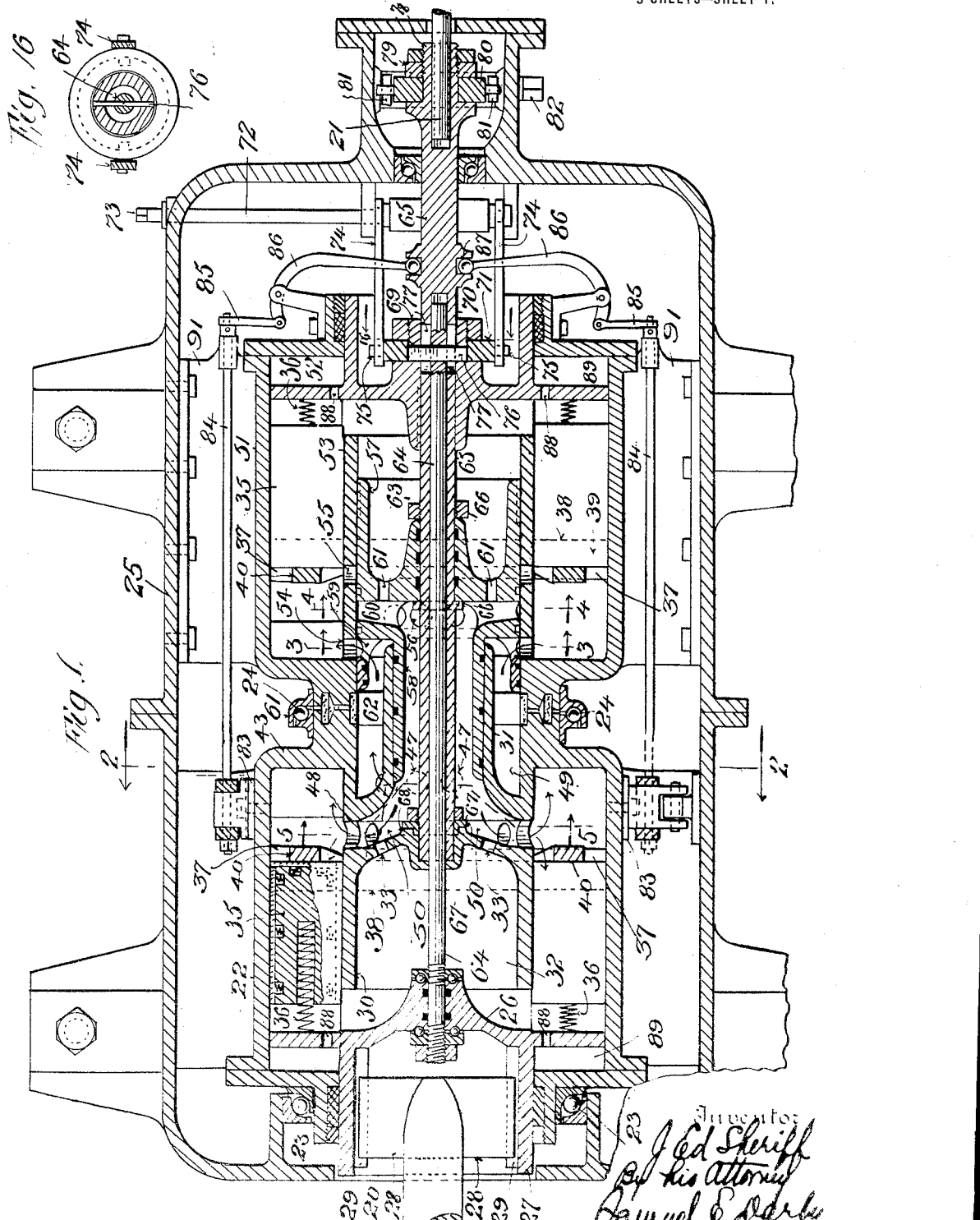

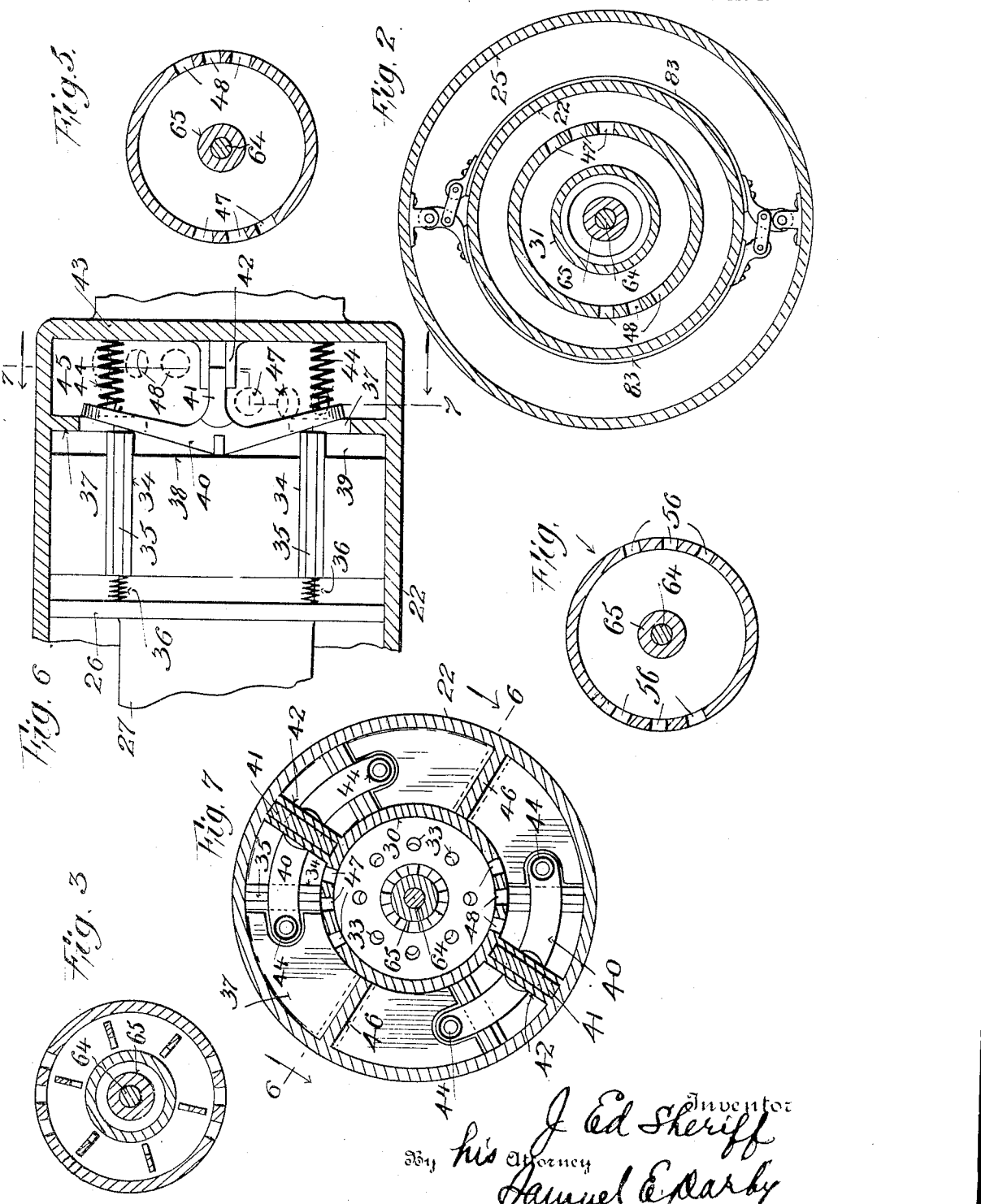

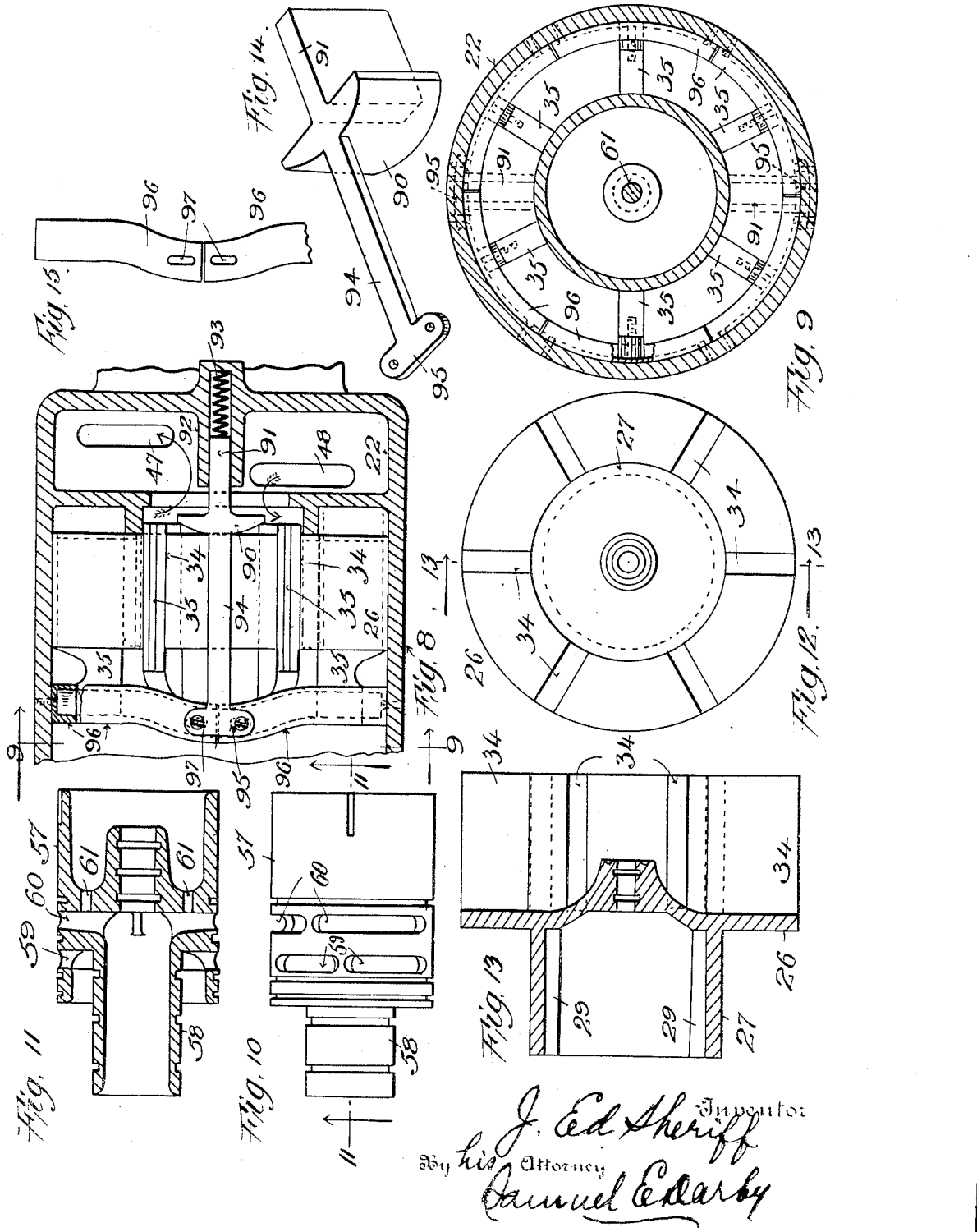

J ED SHERIFF, OF NEW YORK, N. Y.

TRANSMISSION MECHANISM.

1,365,553.   Specification of Letters Patent.   Patented Jan. 11, 1921.

Application filed May 27, 1916. Serial No. 100,322.

*To all whom it may concern:*

Be it known that I, J ED SHERIFF, a citizen of the United States, residing at New York, in the county and State of New York, have made a certain new and useful Invention in Transmission Mechanism, of which the following is a specification.

This invention relates to transmission mechanism, and particularly to mechanism of the character employed to transmit power from a prime motor to a part to be driven.

The object of the invention is to provide a power transmitting mechanism of the character referred to in which the speed and direction of operation of the part to be driven may be varied and controlled without varying the speed or direction of the prime motor.

A further object is to provide means to vary the speed and direction of operation of the part to be driven without employing change or speed gear connections.

A further object is to employ rotary oil pump and motor devices operable in relatively reverse directions as elements of a power transmitting mechanism, with suitable control mechanism therefor.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings:

Figure 1 is a view in central longitudinal section showing a power transmitting mechanism embodying the principles of my invention.

Fig. 2 is a transverse section on the line 2, 2, Fig. 1, looking in the direction of the arrows.

Fig. 3 is a view in transverse section on the line 3, 3, Fig. 1, looking in the direction of the arrows.

Fig. 4 is a similar view on the line 4, 4, Fig. 1, looking in the direction of the arrows.

Fig. 5 is a similar view on the line 5, 5, Fig. 1, looking in the direction of the arrows.

Fig. 6 is a broken detail view in longitudinal section on the line 6, 6, Fig. 7, looking in the direction of the arrows, showing the structure of one of the pump devices, the partition portions 46, and the projecting portion 30 of the pump casing being omitted, and the port openings 47, 48, in the latter being merely indicated.

Fig. 7 is a transverse section on the line 7, 7, Fig. 6, looking in the direction of the arrows.

Fig. 8 is a view similar to Fig. 6, showing a modified arrangement embodying my invention.

Fig. 9 is a view in transverse section on the line 9, 9, Fig. 8, looking in the direction of the arrows.

Fig. 10 is a detached detail view of the shifting control valve.

Fig. 11 is a view in section on the line 11, Fig. 10, looking in the direction of the arrows.

Fig. 12 is a detached detail view in end elevation of one of the rotors employed in accordance with my invention.

Fig. 13 is a view in section on the line 13, 13, Fig. 12.

Figs. 14 and 15, are detached detail views of parts employed in connection with the modified construction shown in Figs. 8 and 9.

Fig. 16 is a transverse section on the line 16, 16, Fig. 1, looking in the direction of the arrows.

The same part is designated by the same reference numeral wherever it occurs throughout the several views.

In effecting the transmission of power from a prime motor to a part to be driven it is desirable to effect variations in the speed and direction of rotation of the driven part without altering the speed or direction of the prime motor. It is also desirable to effect the variation in speed and direction of the driven part without shock or impulse effects due to the use of change gear connections. It is also desirable, particularly in the case of motor mechanism for automobiles or other propelled vehicles, to secure compactness of structure and arrangement as the available space is limited.

It is among the special purposes of my present invention to provide a power transmitting mechanism which attains the advantages above noted, as well as others, in a simple and efficient manner.

In carrying out my invention I propose to employ a rotary oil pump and a rotary motor which feed the one into the other and which are operable in reverse directions with relation to each other and which are easily and readily controllable as to their relative speeds as well as to their relative direction in such manner as to avoid the objectionable effects of shock or impulse action.

Referring to the accompanying drawings reference numeral 20 designates the shaft or other convenient and suitable driven part of a prime motor, which is adapted to be driven at constant speed and in constant direction, subject, of course, to any ordinary or usual control of such motors. The part to be driven is indicated at 21, and, in this instance, is shown, for illustrative purposes, as the tail shaft for a motor driven vehicle. Interposed between these members 20, 21, is the transmitting mechanism embodying my invention and which includes a rotary pump which delivers the operating medium, say for instance oil, into what I will call an oil motor, said pump and oil motor being controlled, arranged, and related with respect to each other and to the driving and driven members 20, 21, in accordance with my invention, in such manner, as to effect the desired variations in speed and direction of rotation of the driven member 21, without altering the speed or direction of rotation of the driving member 20.

The pump includes a cylindrical casing 22 which is mounted to rotate, as, for example, on the ball bearings 23, 24, within the inclosing casing 25, which is mounted on the frame of the vehicle to be driven, in the case of an automobile, for example, or other suitable support. The cylindrical casing 22 may also be locked against rotation, as will be more fully hereinafter described. Mounted and operating within the cylindrical casing 22 is a rotor 26, including a cylindrical portion 27, which extends toward the driving member 20 and encompasses the rear end thereof, as shown in Fig. 1. A driving connection between the member 20 and the rotor 26 is provided which permits the rotor to be shifted endwise without interfering with the driving action. A simple arrangement is shown for accomplishing this result wherein the shaft 20 is provided with a transversely extending key plate 28, the ends of which engage in suitable key ways 29, formed on the inner surface of the extension 27 of the rotor 26.

The pump casing 22, is provided centrally thereof with a forwardly projecting cylindrical extension 30, and also with a rearwardly projecting cylindrical sleeve portion or hub 31. The extension 30 in coöperation with the rotor 26, forms a closed chamber 32, which serves as a storage space for the oil or other operating medium. The operating medium gains access to the chamber 32, through openings 33. The rearwardly projecting outer annular portion of rotor 26 is provided with a series of longitudinally extending slots or seats 34, in which are mounted the longitudinally slidable vanes 35. Any desired number of these vanes may be employed. In the particular form shown, to which, however, my invention is not to be limited or restricted six of such vanes are employed and they are spaced an equal distance apart circumferentially as clearly indicated in Fig. 12. The vanes 35 are yieldingly impelled rearwardly or toward the driven shaft 21 from the drive shaft 20. Springs 36 are shown for this purpose, said springs bearing at their forward ends against the end wall of rotor 26, and at their rearward ends against the forward ends of the vanes 35. At their rearward ends the vanes 35 bear against the inwardly extending wall portion 37 of casing 22, and which constitutes, in effect one of the walls of the working cylinder of the pump. The portions of the vanes 35 which project beyond the rear end of the rotor indicated by the dotted line at 38, in Fig. 1, when the rear ends of the vanes bear against the wall portion 37 of the casing 22, see Fig. 6, constitute the working areas of the vanes acting upon the oil or other medium to force the same into the motor as will be more fully hereinafter described. These projecting areas of the vanes also serve to create a suction action to draw the operating medium back into the pump from the motor. It will be seen that the pumping as well as the suction action exerted by the vanes is accomplished by the side surfaces of the vanes, or the portions thereof which project beyond the rear end of the rotor. It will also be seen that the space 39, see Fig. 6, between the rear end 38 of the rotor 26, and the cylinder wall 37, constitutes the working space of the pump, and by varying the area of this space the volume of the operating medium delivered by the pump to the motor to drive the latter is correspondingly varied. The desired variation in the working area of the pump is accomplished by shifting the rotor 26 endwise, this endwise shifting movement being effected, without disturbing its driving connection with the prime motor shaft 20.

The pump vanes 35 are forced forwardly in their slots in rotor 26, periodically in the cycle of operation of the pump so as to withdraw the effective working surface thereof from projection into the working area 39 of the pump. This may be accomplished in various ways. A simple arrangement is shown for this purpose, but to which my invention is not to be limited or restricted, wherein cam heads 40 are arranged in the path of the projecting ends of the vanes 35 and over the inclined or cam surfaces of which the ends of the vanes ride. The cam heads 40, are carried by stem portions 41, which work in guides 42 connected to the extreme end portion 43 of the casing 22, and said cam heads are yieldingly pressed, forwardly into the path of the vane ends in any convenient manner, as, for example, by means of springs 44. The space 45, between the cylinder wall 37, and the end wall 43 of casing 22 in which the stems 41 of the cam heads 40 work is divided by a partition 46, see Fig. 7, into two separated annular chambers in each of which is arranged a cam head 40. The forwardly extending central portion 30 of casing 22 is provided with the two sets of port openings 47, 48, respectively delivering into the chambers into which the space 45 is divided.

The casing 22 is provided with the passages 49, 50, with which the ports 47, 48, respectively communicate. The passage 49 constitutes the delivery passage for the operating medium from the pump to the motor, while the passage 50 constitutes the suction or intake passage from the motor to the pump.

The structure of the motor is, in its essential elements similar to that of the pump above described. Thus it includes a cylindrical casing 51, which, however, instead of being journaled to rotate as in the case of cylinder 22 of the pump, is fixedly supported by the webs 91 within the main casing 25. A rotor 52 is provided which is similar in detail to rotor 26 of the pump, and having pockets for vanes 35, which are spring pressed by means of springs 36, against a cylinder wall at the forward end of the casing 51, with cam heads 40, and a working space or area 39, just forward of the front edge 38 of the rotor, all arranged as above described with reference to the member 26 of the pumps, and therefore further description of these details is unnecessary. The member 52 is connected through intermediate devices to rotate with the tail or driven shaft 21, in such manner as to permit said member to be shifted longitudinally of the casing 51, without disturbing the driving connection between said member and the shaft 21, as will presently be more fully explained.

As above described with reference to casing 22, the casing 51, is provided with an interior rearwardly extending centrally disposed cylindrical portion 53, which, coöperating with the exterior casing 51, forms an annular space within which the motor vanes 35 operate. Through the cylindrical portion 53 are formed three sets of port openings indicated, respectively, at 54, 55 and 56. The port openings 54, 55, 56, are controlled by a piston valve 57, having a head portion which is received and works within the interior chamber of cylindrical portion 53 of the casing. The piston valve is also provided with a forwardly extending tubular portion 58, which fits and works within the tubular sleeve portion 31 of casing 22. The piston valve is provided with openings or passages 59, 60 and 61, as clearly shown in Figs. 1, 10 and 11. The openings 59 at one limit of shift of the piston valve, coöperate with the port openings 54, to open a free passage for the operating medium to be impelled from the pump through ports 47 and through chambers 49, passage 62, passages 59, and ports 54 into the motor to drive the latter in one direction. This is the position and arrangement of the parts shown in Fig. 1. The valve openings 60, in the position of the parts shown in Fig. 1, coöperates with the motor cylinder ports 56, to serve as an exhaust path from the motor through said ports 56, passages 60, the bore of extension 58, and intake passage 50 and ports 48 into the pump. In this relation of the parts the port openings 55 of the motor are closed. Now, by shifting the piston valve toward the right to the other limit of its working movement, and without disturbing in any respect the port openings of or the supply and delivery passages from the pump, the motor ports 54, will be closed, the motor ports 56 are brought into communication with the valve passages 59 and the motor ports 55 are brought into communication with passages 60. Therefore what, before, were the exhaust ports from the motor now become the motor supply or intake ports, the exhaust now being effected from the motor through ports 55 and piston passages 60. Consequently the direction of operation of the motor will thus be reversed.

The rear end of the piston valve head 57, in conjunction with the cylinder 53, in which said head works, forms a closed chamber 63 for the storage of excess operating medium over what may be required in operation of the pump motor system. The excess or surplus medium reaches the chamber 63, or is drawn from said chamber through the openings 61.

The rotor 26 of the pump is journaled to freely rotate upon a control rod 64. This rod is shiftable longitudinally and the connections of the rotor thereto are such as to permit the rotation of the latter while compelled to be shifted or moved with the rod 64 in the longitudinal movements of said rod. This rod extends longitudinally into an extended bore of a sleeve member 65, which is also mounted to move longitudinally, the arrangement being such that when the rod is shifted endwise the rotors 26 and 52 shift with it without shifting the sleeve 65, but the sleeve 65 may be shifted endwise independently of the rod. The shaft 21 to be driven is keyed or otherwise connected to rotate with the member 65, while permitting longitudinal movement of the latter. The rotor member 52 of the motor is keyed or otherwise connected to the member 65 to rotate therewith, while permitting longitudinal movement of the latter or shifting movement of the former upon the latter. The piston valve 57 is held between two collars 66 on sleeve 65, and consequently is shifted therewith. Also carried by said sleeve 65 is a clutch member 67, which clutches into clutch teeth formed on the hub portion 68 of cylinder casing 22, of the pump, when the sleeve 65 is shifted into one limit of its movement, this being the arrangement of the parts shown in Fig. 1. This clutch engagement is maintained until the member 65 is again shifted to the right from the position shown in Fig. 1, to effect a reversal of the direction of rotation of the motor.

As will be understood from the foregoing description, taken in connection with the drawings, the control rod 64, and the rotors 26 and 52, of the pump and motor, respectively, are connected to move together in unison when said rod is shifted while permitting the independent rotation of said rotors. The shifting of the rotors 26, 52 in unison when the rod 64 is shifted longitudinally, effects a reciprocal variation of the effective pump and motor working areas 39. That is to say, when rod 64 is shifted toward the left the pump working area 39 is increased and the motor working area 39 is correspondingly decreased, and when said rod is shifted to the right the pump working area is decreased and the motor working area is correspondingly increased. This secures the desired speed control of the transmission mechanism.

Various arrangements may be employed to effect the longitudinal shifting of the speed control rod 64. The essential feature is to accomplish the shifting movement of said rod to effect the desired speed control without shifting the reversing sleeve member 65, and also to cause the rotors 26 and 52 to be shifted in unison without interfering with the independent rotations of said rotors. As above explained the rotor 26 is journaled to rotate upon the rod 64 but is connected to move with said rod when the latter is shifted longitudinally. I will now describe an illustrative arrangement which is simple and efficient for permitting the rod 64 to be shifted longitudinally without shifting the reversing sleeve member 65 and also to cause the rotor 52 to shift with said rod without interfering with the rotation of said rotor.

The hub of rotor 52 is reduced as at 69, the reduced portion being exteriorly threaded to receive a retaining sleeve nut 70. This arrangement provides an annular channel or groove between the sleeve nut and the hub of the rotor to receive a slip ring 71. To this slip ring are connected suitable devices for shifting the same and consequently the rotor 52 and rod 64. A simple arrangement is shown wherein a rock shaft 72 is journaled in the casing 25, and operable in any convenient manner, as, for example, by applying an operating lever to the end 73 of said shaft which extends beyond the casing. Links or crank arms 74, connect said shaft with pins 75 on the slip ring 71, so that when shaft 72 is rocked the desired shifting of the ring 71, and of the rotor 52 with it is effected. A pin 76, extends transversely through the rod 64, and has its ends extending into seats or holes formed in the hub of the rotor 52. This pin works through elongated slots 77, in sleeve member 65. From this construction it will be readily understood that when the control shaft 72 is rocked not only will the speed control rod 64 be shifted but also such shifting movement will cause the rotors 26 and 52 to be shifted in unison, and without interfering with the independent rotation of said rotors and without affecting the reverse control sleeve 65. By employing an operating lever for shaft 72, which will permit the rocking of said shaft and its retention in any adjusted position it will be seen that the desired change in speed of the driven shaft 21 from zero to maximum or the reverse, may be effected smoothly and evenly and without the shock or jar or shifting speed change gears, thus eliminating the vibrations and jerks incident to sudden speed changes or impulse action.

I will now describe means for shifting the sleeve member 65 to effect a reversal of the direction of rotation of driven shaft 21 without affecting the direction of rotation of the driving shaft 20.

As above explained the shaft 21 is keyed to rotate with sleeve member 65, and consequently will follow the direction of rotation of said sleeve member while permitting the longitudinal shifting movement of said sleeve member. This sleeve member is provided with a reduced portion 78 at its end which is exteriorly threaded to receive a retaining sleeve nut 79, thereby forming an annular channel to receive a shifter ring 80 which is engaged by crank arms 81 actuated by a rock shaft 82, similar in all respects to the shifter ring 71, and its operating means as above explained. By rocking shaft 82 the reversing sleeve member 65 is shifted longitudinally without interfering with the rotation thereof, to accomplish the reversal in the direction of operation of the oil motor. When said sleeve member 65 is shifted to the right from the position of the parts as shown in Fig. 1, the piston valve 57 is shifted with it, with the consequent reversal of the direction of intake and exhaust of operating medium to and from the motor as above explained. At the same time the clutch 67, 68 is disengaged. When this reversal takes place the pump casing 22, which before has been free to rotate upon its bearings 23, 24, should be retained against rotation. The result may be accomplished in many specifically different ways. A simple arrangement is shown wherein brake bands 83 are applied to the exterior surface of cylindrical casing 22, and are operated to grip and release said cylinder by means of suitable rods 84, which are actuated coincidently with the shifting of reversing sleeve member 65, through links 85, and bell crank levers 86, having their inner ends engaging in a peripheral channel 87 in the sleeve member 65.

From the foregoing description it will be understood that the rotor 26 carrying the pump vanes 35 is always driven in the same direction and at the same speed as the driving shaft 20, and with the parts in the positions shown in Fig. 1, the pump casing 22 is also free to revolve, and since this casing is clutched to sleeve member 65, which, in turn is keyed to shaft 21, the driving effort of the revolving pump casing 22 is transmitted directly to the driven shaft 21, as long as the clutch members 67, 68 are in engagement. This means that whatever of the driving power of the pump which is not utilized in the oil motor to drive the latter, and through it, or the rotor 52 thereof to drive the sleeve member 65 and shaft 21, is directly transmitted through casing 22 to said shaft 21, and hence I am enabled to employ a greatly reduced volume of operating medium to operate the oil motor.

In order to secure as easy shift of the rotors 26, 52, to effect the desired speed control, openings 88 are formed through the web portions of said rotors to permit the reserve supply of operating medium contained in the reservoirs 32 and 63 to gain access to the spaces 89 between said rotors and the outer end walls of their casings 22, 51.

In Figs. 8, 9, 14 and 15, I have shown a slightly modified arangement of pump wherein the cam heads 90 are provided with stems 91, which work in seats 92, in the casing 22, and are yieldingly impelled outwardly by springs 93. The cam heads are provided with extensions 94 which terminate in cross heads 95, the ends of which are connected to the proximate ends of band or strap ring sections 96, through elongated slots 97.

It is to be understood that many variations and changes in the details of construction and arrangement of parts might readily occur to persons skilled in the art, and still fall within the spirit and scope of my invention. While, therefore, I have shown and described one embodiment of the principles of my invention I do not desire to be limited or restricted to the exact details shown.

What I claim as new and useful and of my own invention, and desire to secure by Letters Patent, is—

1. In a transmission mechanism a driving shaft, a shaft to be driven, a pump including a rotating case and a rotor, said rotor connected to the driving shaft, a motor including a stator and a rotor, said rotor being connected to the shaft to be driven, and means to control the relative speeds of said rotors.

2. In a transmission mechanism a driving shaft, a shaft to be driven, a pump including a pair of rotors, one of said rotors being connected to the driving shaft, a motor including a rotor connected to the shaft to be driven, and means to vary the effective working areas of said pump and motor.

3. In a transmission mechanism a driving shaft, a shaft to be driven, a pump including a pair of rotors, one of said rotors being connected to the driving shaft, a motor including a rotor connected to the shaft to be driven, and means to reciprocally vary the effective working areas of said pump and motor.

4. In a transmission mechanism a driving shaft, a shaft to be driven, a pump including a pair of rotors, one of said rotors being connected to the driving shaft, a motor including a rotor connected to the shaft to be driven, and means to vary the speed of the rotor of the motor without varying the speed of the rotor of the pump.

5. In a transmission mechanism a driving shaft, a shaft to be driven, a pump including a pair of rotors, one of said rotors being connected to the driving shaft, a motor including a rotor connected to the shaft to be driven, and means to vary the speed and direction of the last mentioned rotor without varying the speed or direction of the first mentioned rotor.

6. In a transmission mechanism a driving shaft, a shaft to be driven, a pump including a rotor connected to the driving shaft, a motor including a rotor connected to the shaft to be driven and said rotors being mounted to rotate independently of each other, and means connecting said rotors to shift them in unison.

7. In a transmission mechanism a driving shaft, a shaft to be driven, a pump including a rotor connected to the driving shaft, a motor including a rotor connected to the shaft to be driven and means connecting said rotors to shift them in unison to vary the speed of the motor without varying the speed of the pump.

8. In a transmission mechanism a driving shaft, a shaft to be driven, a pump including a rotor connected to the driving shaft, a motor including a rotor connected to the shaft to be driven, and means connecting said rotors to shift them in unison to reciprocally vary the effective working areas of the pump and motor.

9. In a transmission mechanism a driving shaft, a shaft to be driven, a pump including a rotatable case and a rotor, said rotor being connected to the driving shaft, a motor including a rotor connected to the shaft to be driven, said rotors having longitudinally extending peripherally spaced seats, and vanes movably mounted in said seats.

10. In a transmission mechanism a driving shaft, a shaft to be driven, a pump including a rotor connected to the driving shaft, a motor including a rotor connected to the shaft to be driven, said rotors having longitudinally extending peripherally spaced seats, vanes mounted in said seats and means to yieldingly impel said vanes to project at their ends beyond said seats to present working surfaces.

11. In a transmission mechanism a driving shaft, a shaft to be driven, a pump including a rotor connected to the driving shaft, a motor including a rotor connected to to the shaft to be driven, said rotors having longitudinally extending peripherally spaced seats, vanes mounted in said seats and means to yieldingly impel said vanes to project at their ends beyond said seats to present working surfaces and means to periodically force the projecting ends of said vanes back into the confines of said seats.

12. In a transmission mechanism a driving shaft, a shaft to be driven, a pump including a rotor connected to the driving shaft, a motor including a rotor connected to the shaft to be driven, said rotors having longitudinally extending peripherally spaced seats, vanes mounted in said seats and means to yieldingly impel said vanes to project at their ends beyond said seats to present working surfaces and means to shift said rotors to vary the extent of projection of the ends of said vanes beyond their rotor seats.

13. In a transmission mechanism a driving shaft, a shaft to be driven, a pump including a rotor connected to the driving shaft, a motor including a rotor connected to the shaft to be driven, said rotors having longitudinally extending peripherally spaced seats, vanes mounted in said seats and means to yieldingly impel said vanes to project at their ends beyond said seats to present working surfaces, and cam heads against which the projecting ends of said vanes work.

14. In a transmission mechanism a driving shaft, a shaft to be driven, a pump including a rotor connected to the driving shaft, a motor including a rotor connected to the shaft to be driven, said rotors having longitudinally extending peripherally spaced seats, vanes carried in said seats, means to cause the ends of said vanes yieldingly to project beyond the said seats, end walls against which the projecting ends of said vanes bear, and cam surfaces in said end walls to force the vanes back into their seats.

15. In a transmission mechanism a driving shaft, a shaft to be driven, a pump including a rotor connected to the driving shaft, a motor including a rotor connected to the shaft to be driven, said rotors having longitudinally extending peripherally spaced seats, the seats of said rotors respectively presenting toward each other, vanes movably mounted in said seats and having their proximate ends extending beyond their respective rotors, to form working areas, and means to reciprocally vary said working areas.

16. In a transmission mechanism a driving shaft, a shaft to be driven, a pump including a rotor connected to the driving shaft, a motor including a rotor connected to the shaft to be driven, said rotors having longitudinally extending peripherally spaced seats, the seats of said rotors respectively presenting toward each other, vanes movably mounted in said seats, and having their proximate ends extending beyond their respective rotors, and means to shift said rotors in unison, to reciprocally vary the extent of projection of said vanes.

17. In a transmission mechanism, a driving shaft, a shaft to be driven, a pump including a rotor connected to the driving shaft, a motor including a rotor connected to the shaft to be driven, said rotors having longitudinally extending peripherally spaced seats, the seats of said rotors respectively presenting toward each other, vanes movably mounted in said seats, and having their proximate ends extending beyond their respective rotors, relatively stationary end walls against which the projecting vane ends bear, and means to shift said rotors in unison to reciprocally vary the extent of projection of said vanes.

18. In a transmission mechanism, a driving shaft, a shaft to be driven, a pump including a rotor connected to the driving shaft, a motor including a rotor connected to the shaft to be driven, said rotors having longitudinally extending peripherally spaced seats, the seats of said rotors respectively presenting toward each other, vanes movably mounted in said seats, and having their proximate ends extending beyond their respective rotors, relatively stationary end walls against which the projecting vane ends bear, and cam surfaces arranged in said end walls to periodically force said projecting vanes back into their seats in their respective rotors.

19. In a transmission mechanism a driving shaft, a shaft to be driven, a pump including a rotor connected to the driving shaft, a motor including a rotor connected to the shaft to be driven, said pump and motor each including a casing, the pump casing being mounted to rotate and the motor casing being fixed, and means to couple the pump casing to the shaft to be driven.

20. In a transmission mechanism a driving shaft, a shaft to be driven, a pump including a rotor connected to the driving shaft, a motor including a rotor connected to the shaft to be driven, said pump and motor each having a casing, means for allowing said pump casing to rotate, and means for preventing the rotation of said motor casing, and means to form a storage chamber for the operating medium within said casings.

21. In a transmission mechanism a driving shaft, a shaft to be driven, a pump including a rotor connected to the driving shaft, a motor including a rotor connected to the shaft to be driven, said pump also including a casing, said casing having an extension forming a guide, and a piston valve having an extension to work in said guide.

22. In a transmission mechanism a driving shaft, a shaft to be driven, a pump including a rotor connected to the driving shaft, a motor including a rotor connected to the shaft to be driven, said motor also including a casing having an interior chamber, and a piston valve having a head arranged to work in said chamber.

23. In a transmission mechanism a driving shaft, a shaft to be driven, a pump including a rotor connected to the driving shaft, a motor including a rotor connected to the shaft to be driven, said motor and pump each also including a casing, the pump casing having an extension forming a guide, and the motor casing having an interior chamber, and a piston valve having its head arranged to operate in said chamber and an extension arranged to operate in said guide.

24. In a transmission mechanism a driving shaft, a shaft to be driven, a pump including a rotor connected to the driving shaft, a motor including a rotor connected to the shaft to be driven, said pump including a casing mounted to rotate, means to couple said casing to the driven shaft, and means to reverse the motor, said means also operating to uncouple the connection between the pump casing and driven shaft.

25. In a transmission mechanism a driving shaft, a shaft to be driven, a pump including a rotor connected to the driving shaft, a motor including a rotor connected to the shaft to be driven, said pump including a casing mounted to rotate, and means to reverse said motor, said means also operating to lock the pump casing against rotation.

26. In a transmission mechanism a driving shaft, a shaft to be driven, a pump including a rotor connected to the driving shaft, a motor including a rotor connected to the shaft to be driven, said pump including a casing mounted to rotate, a driving connection between said casing and the driven shaft, and means to reverse the motor, said means also operating to release said driving connections and to lock said pump casing.

27. In a transmission mechanism, a driving and a driven shaft, connections intermediate said shafts including a pump and a motor working the one into the other, a reversing member and means to operate it, a control valve connected to move with the reversing member, the motor including a rotor mounted to rotate with but permitting independent actuation of said reversing member.

28. In a transmission mechanism, a speed control rod, a reversing sleeve member, into which said rod extends, a pump including a rotor mounted to rotate upon but partaking of the longitudinal movement of said rod, a motor including a rotor mounted to rotate with said sleeve member but permitting relative independent movements of said rotor and sleeve, and also connected to partake of the longitudinal movement of said rod, a reversing valve device connected to move with said sleeve, a driving shaft connected to the pump rotor, a driven shaft connected to the motor rotor, means to longitudinally move the said rod and independent means to longitudinally move the reversing sleeve member.

29. In a transmission mechanism, a driving member, a member to be driven, a pump including a rotating case and a rotor, means for connecting said case to the member to be driven, and means for connecting said rotor to the driving member, a motor including a rotor and a stator and means for connecting the rotor to the member to be driven.

30. In a transmission mechanism, a driving member, a member to be driven, a pump including a pair of rotors, one rotating the other through the medium of a fluid, means for connecting one of said rotors to the member to be driven, means for connecting the other of said rotors to the driving motor, a motor including a stator and a rotor, said rotor being fastened to the member to be driven.

31. In a transmission mechanism, a driving member and a member to be driven, at a speed varying from the speed of the driving member, a pump cylinder, supply and exhaust ports formed therein, said pump and ports rotating about the same axis, and said pump cylinder being detachably connected to the part to be driven, a motor including a stator and a rotor, said motor being operated by the discharge of said pump, said rotor being connected to the part to be driven.

32. In a transmission mechanism, a power driven rotary pump, a rotary motor actuated thereby, a variable speed member to be driven, means connecting a member of said pump to said variable speed member, and means also connecting the rotor of said motor to said variable speed member, said pump and motor adapted to vary the speed of said variable speed member between zero and the full speed of the power driven pump.

33. In a transmission mechanism, the combination with a member to be driven, a pump including a rotor, power driven means for driving said pump, a motor including a rotor operated by said pump, means including clutch devices for connecting a member of said pump to the member to be driven, and means also connecting the rotor of said motor to the member to be driven, said pump and motor adapted to vary the speed of said member to be driven between zero and the full speed of the power driven means.

34. In a transmission mechanism, a motor, a power driven driving shaft, and a shaft to be driven, a rotary pump actuated by the driving shaft and driving said motor, connections between the motor and the shaft to be driven, and clutch devices for connecting and disconnecting a member of the pump to the shaft to be driven without disturbing the connection of the motor to said shaft, said pump and motor adapted to vary the speed of said member to be driven between zero and the full speed of the power driven driving shaft.

35. In a transmission mechanism, a driving member and a driven member, in combination with a motor including a rotor connected to said driven member to actuate the same, and a pump including rotating elements, one of the rotating pump elements being driven from said driving member and operating through a fluid medium to rotate the other of said rotating pump elements, said last mentioned rotating pump element operating through a fluid medium to rotate the rotor of said motor, and means to reciprocally vary the working areas of said pump and motor to vary the speed of said driven member without varying the speed of the said driving member.

36. In a power transmitting mechanism, a power driven rotating driving shaft, and a rotary driven shaft, in combination with a pump including a directly driven rotating element and an indirectly driven rotary element, said directly driven rotary pump element being connected to and driven from the rotary driving shaft, and the indirectly driven rotary pump element being driven from the directly driven pump element through a fluid medium, means connecting the indirectly driven rotary pump element to the rotary shaft to be driven, said means including a motor having a rotor connected to said rotary driven shaft, said rotor being rotarily driven from the indirectly driven rotary pump element through a fluid medium, and means to vary the fluid capacities of said pump and motor to vary the speed of the shaft to be driven.

In testimony whereof I have hereunto set my hand on this 22nd day of May, A. D. 1916.

J ED SHERIFF.